Figure 1:
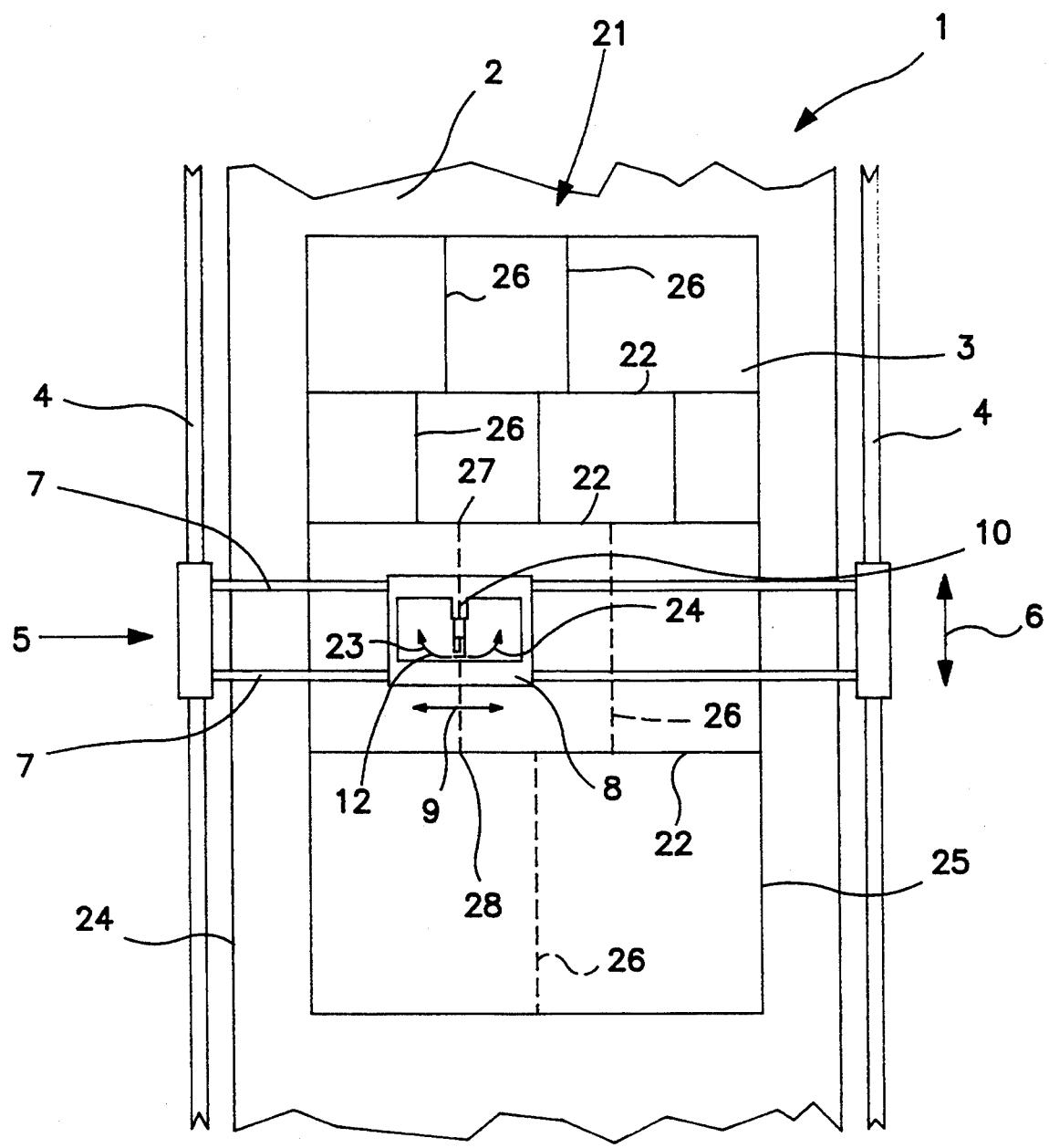

United States Patent [19]

Lisec

[11] Patent Number: 5,449,312
[45] Date of Patent: Sep. 12, 1995

[54] DEVICE FOR CUTTING A GLASS SHEET

[76] Inventor: Peter Lisec, Bahnhofstrasse 34, A-3363 Amstetten-Hausmening, Austria

[21] Appl. No.: 166,842

[22] Filed: Dec. 15, 1993

[30] Foreign Application Priority Data

Dec. 15, 1992 [AT] Austria .................................. 2480/92
Oct. 4, 1993 [AT] Austria .................................. 1987/93

[51] Int. Cl.$^6$ ............................................. B24B 49/00
[52] U.S. Cl. ................................... 451/5; 451/9; 451/10; 451/67; 451/69
[58] Field of Search .................. 451/5, 8, 9, 10, 11, 451/67, 69, 70, 41, 54, 231, 294, 237; 225/2, 3

[56] References Cited

U.S. PATENT DOCUMENTS

| | | |
|---|---|---|
| 4,210,052 | 7/1980 | Fisher . |
| 4,316,565 | 2/1982 | Hodgkinson et al. ................... 225/3 |
| 4,794,684 | 1/1989 | Vanlauwe ............................. 451/69 |
| 4,805,353 | 2/1989 | Keith et al. . |
| 5,040,342 | 8/1991 | McGuire et al. ...................... 451/67 |

FOREIGN PATENT DOCUMENTS 3403682 8/1985 Germany .
4113414 10/1992 Germany .
4118241 12/1992 Germany .
2151167 7/1985 United Kingdom .

*Primary Examiner*—Maurice Rachuba
*Attorney, Agent, or Firm*—Young & Thompson

[57] ABSTRACT

To simplify and to shorten the cutting of a glass sheet (3) with the help of a cutting tool (11) and the removal of a coating applied on glass sheet (3) with the help of a grinding tool (12), the scratching of glass sheet (3) and the removal of the coating in strips lying on both sides of the scratch lines, running parallel to the latter, is performed in a single operation. In the device proposed for this purpose, cutting tool (11) and grinding tool (12) are mounted on a common support (8) movable on a beam (5) over a supporting surface (2) for glass sheet (3). Grinding tool (11) is fastened to an auxiliary support (17), which can be pivoted around axis (10) of cutting tool (11) oriented perpendicular to supporting surface (2). Grinding tool (12) and cutting tool (11) can be raised from glass sheet (3) independently of one another and mounted on the latter. Further, a suctioning of the dust accumulating during removal of the coating from glass sheet (3) is provided.

24 Claims, 6 Drawing Sheets

DEVICE FOR CUTTING A GLASS SHEET

The invention relates to a device for cutting a glass sheet with the help of a cutting tool, which can be rotated around an axis perpendicular to a supporting surface for the glass sheet to be machined, and for removing a coating, applied on the glass sheet, with the help of a grinding tool, which removes the coating from the glass sheet in strips lying on both sides of the scratch lines, running parallel to the grinding tool, with a beam, which is guided movably over the supporting surface on its edges, and with a cutting tool as well as a grinding tool, which are guided movably on the beam along the same.

A device with the features of the introductory part of claim i is known from DE-OS 41 18 241.

The object of the invention is to indicate a device, with which the cutting and the removal of coating from coated glass sheets is possible at high operating speed, and in which the technical expense of the device is as low as possible.

This object is achieved in a generic device in that the cutting tool and the grinding tool are mounted on a common support movable on the beam and in that the grinding tool can be pivoted around an axis oriented perpendicular to the supporting surface.

Since the cutting tool and the grinding tool are mounted on a common support in the device according to the invention, the design and control expense, as compared with the known device (DE-OS 41 18 241), is reduced. Nevertheless, practically all occurring rectangular glass sheet blanks can be produced with an edge from which the coating has been removed.

It is advantageous in the invention that the grinding tool can be pivoted. The grinding or polishing wheel thus can always be oriented so that its axis of rotation is oriented parallel to the axis of rotation of the cutting wheel of the cutting tool and thus perpendicular to its direction of movement. In this case, a special motor is preferably provided for driving the grinding tool.

The operation is preferably performed with the device according to the invention so that the scratching of the glass sheet is made directly after the removal of the coating. This has the advantage that the oily cutting auxiliary materials used during cutting do not adversely affect the removal of coating.

In an embodiment of the invention, it is provided that the grinding tool and the cutting tool can be raised away from the supporting surface independently of one another. With this embodiment, it is prevented that parts of a glass sheet have their coating removed in areas which do not lie in the area of a scratch line. In this embodiment of the invention the removal of the coating on both sides of a scratch line by raising the grinding tool can be stopped, if a scratch line running crosswise to the scratch line to be made is achieved inside the surface of the glass sheet, but the cutting of the glass sheet up to this end of the scratch line is also continued. This embodiment of the invention is used especially when the grinding tool is in front of the cutting tool. With this embodiment, for example, the grinding tool can be lowered at the beginning of a scratch line to he made, whereupon the support of the grinding tool and the cutting tool begins to move in the direction of the scratch line to be made. As soon as the cutting tool is at the beginning of the scratch line to be made, it is also lowered and now makes the scratch line in the area from which the coating has already been removed. At the end of the scratch line to be made, the grinding tool is raised and the cutting tool is further guided up to the end of the scratch line.

According to a preferred embodiment of the invention, it is provided that the grinding tool can be pivoted together with the cutting tool. In this case, a separate drive motor does not have to be provided in each case for the pivot drive of the cutting tool and of the grinding tool, but a single drive motor, which causes the pivoting of the two tools, is sufficient.

Additional features and advantages of the invention are shown by the subclaims as well as the following description of embodiments of the invention with reference to the drawings.

Figure 2:
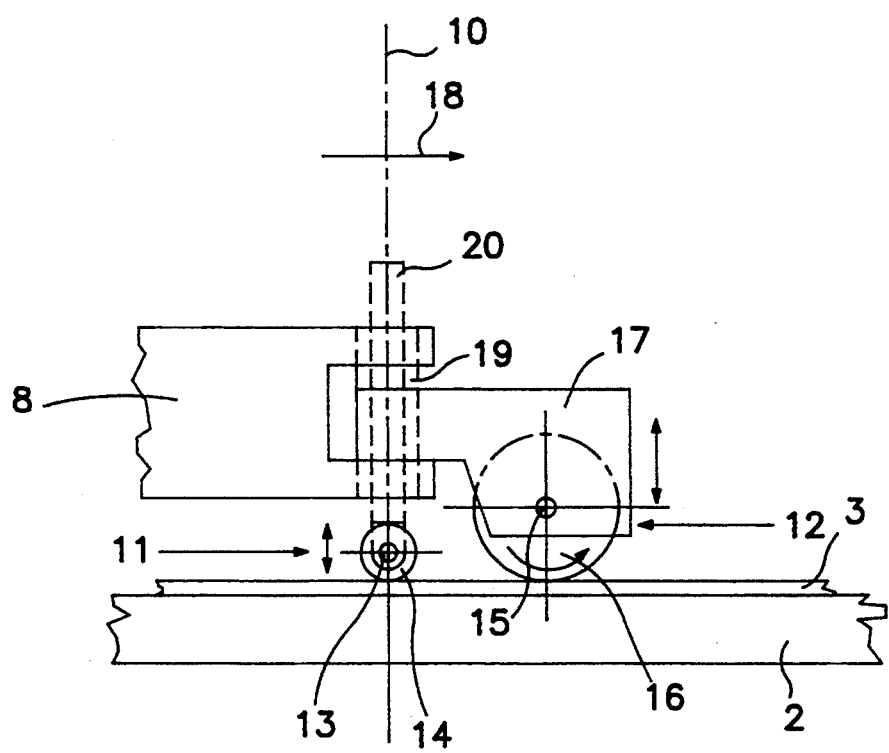
Figure 3:
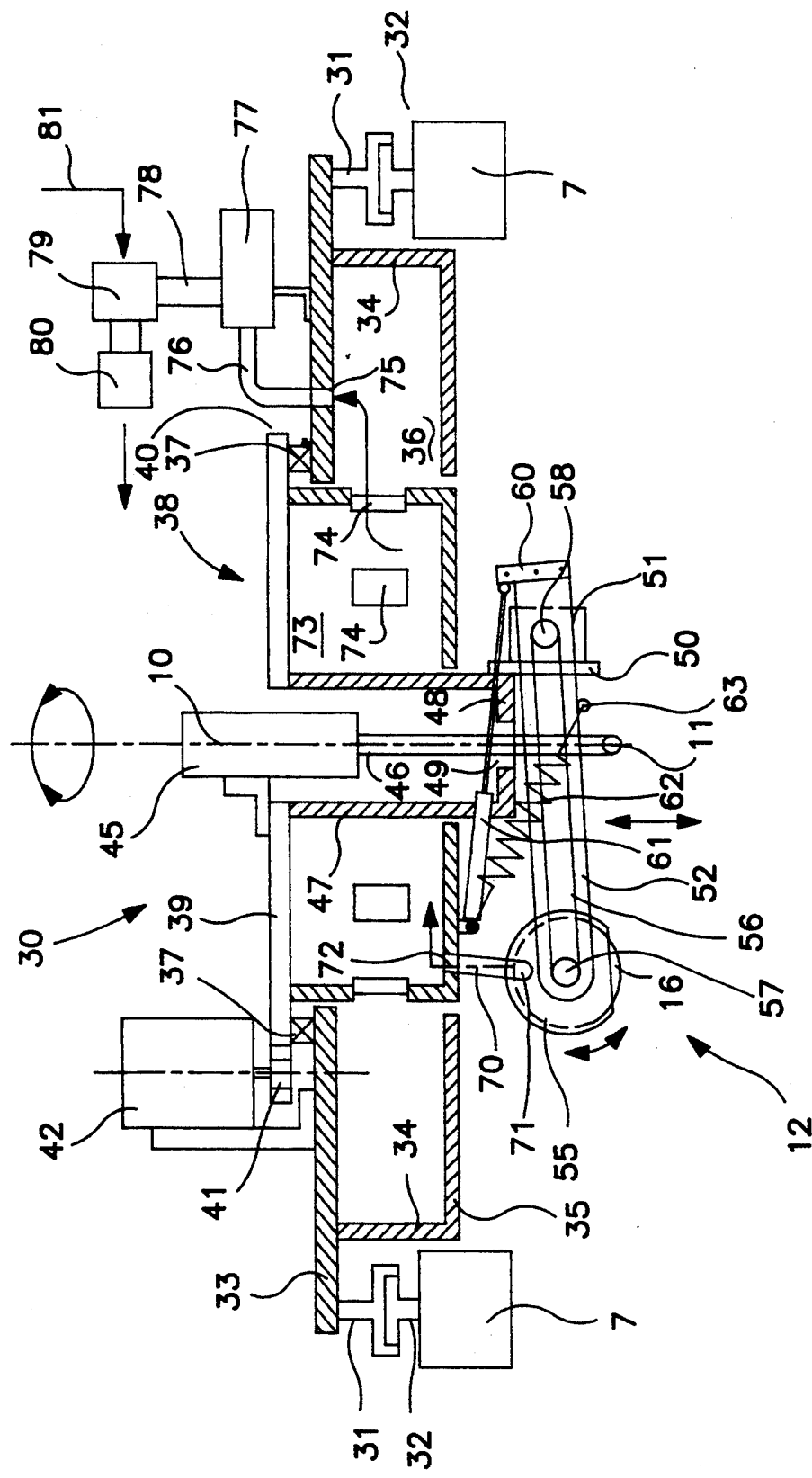
Figure 4:
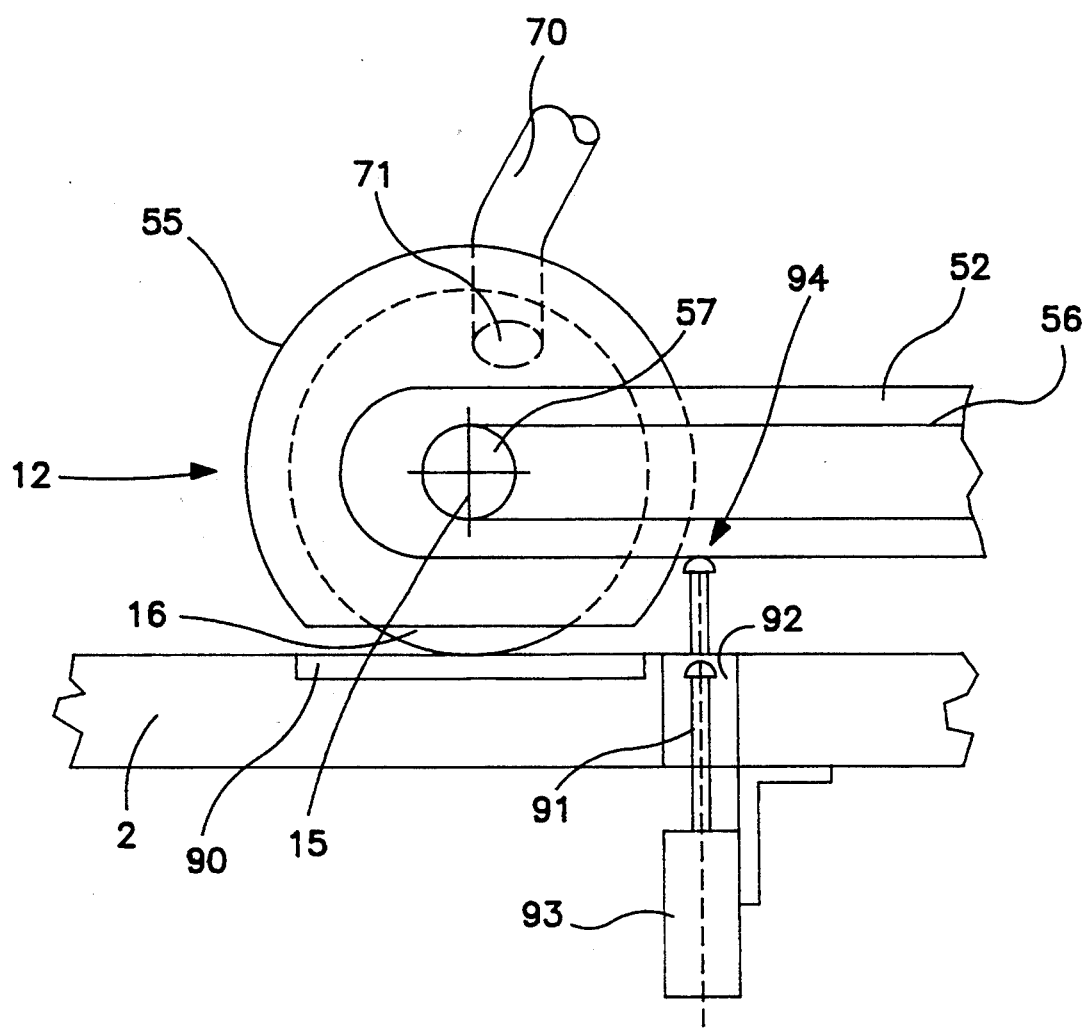
Figure 5:
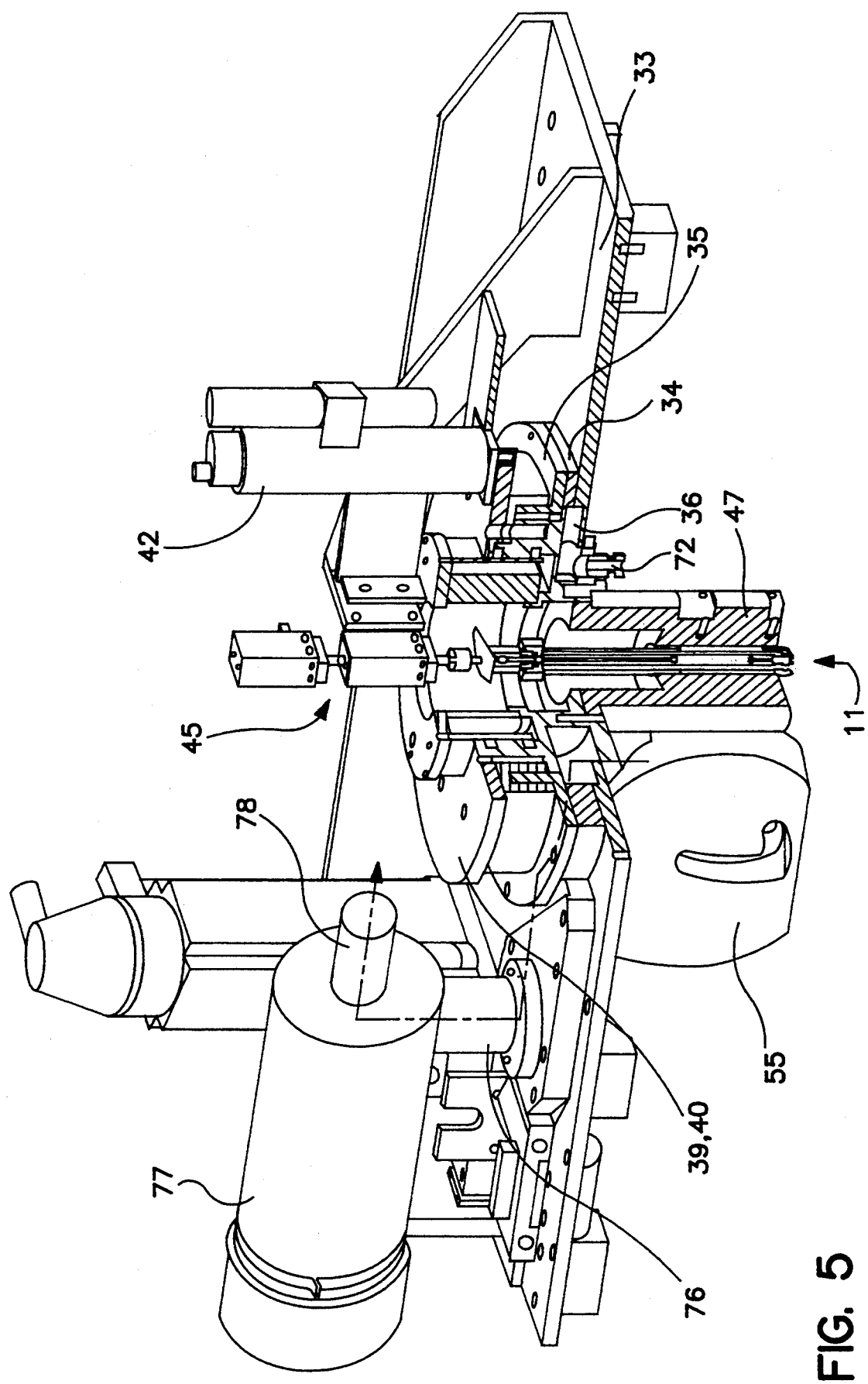
Figure 6:
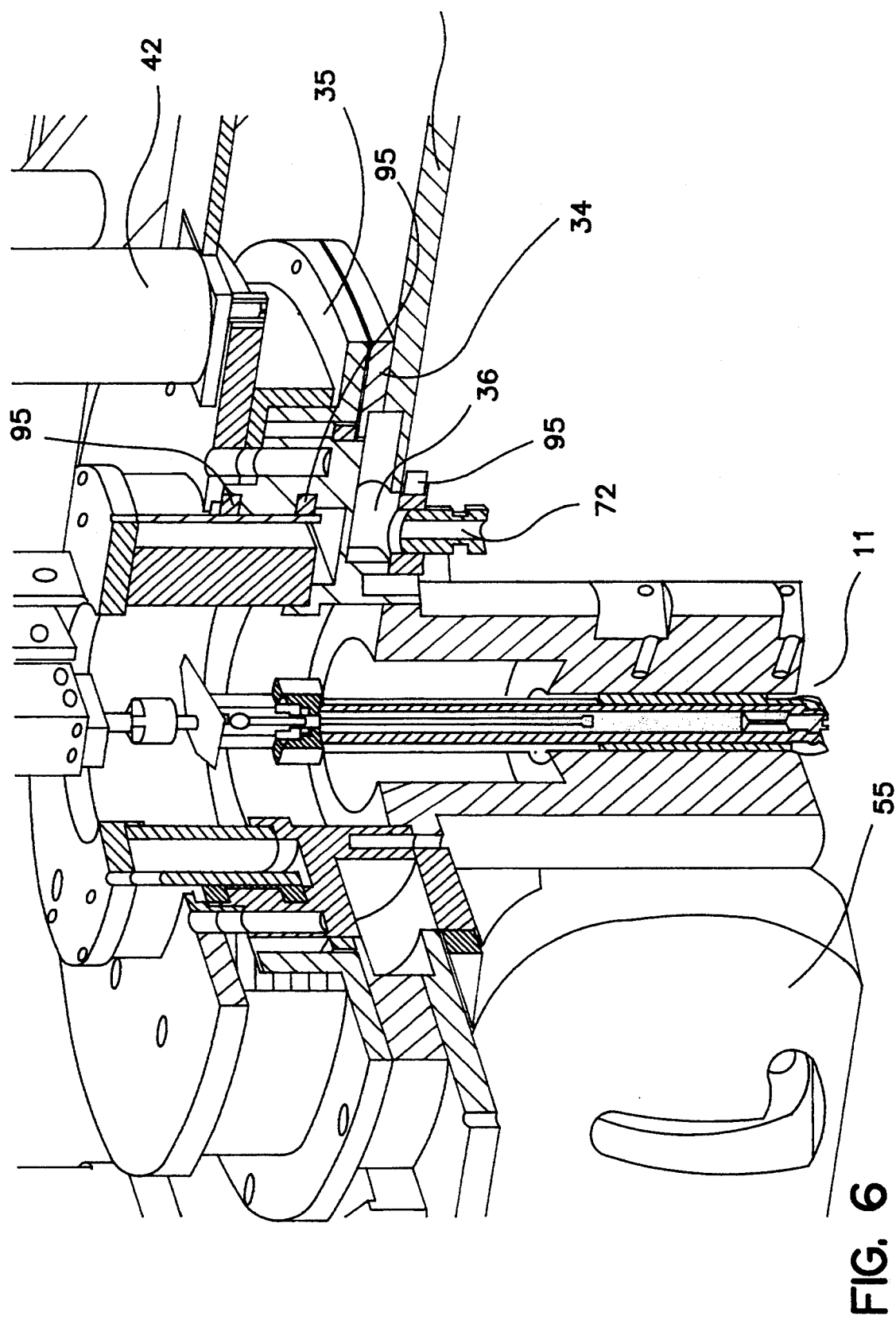

There is shown in:

FIG. 1 a top view of a glass cutting table according to the invention,

FIG. 2 partially the support of the cutting tool and grinding tool on an enlarged scale, FIG. 3 in section, another embodiment of the slide, FIG. 4 an arrangement to determine the wear of the grinding wheel, FIG. 5 partially another embodiment partially cut and in oblique view and FIG. 6 a detail of FIG. 5 in enlarged scale.

A glass cutting table 1 represented in FIG. 1 exhibits a supporting surface 2 for glass sheet 3 to be machined. Supporting surface 2 can be designed as an air cushion table, whose holes can optionally be acted upon with partial vacuum to hold a glass sheet 3 in place during scratching and removal of coating. Optionally lowerable transport straps can be provided in supporting surface 2 for the transport on and off of a glass sheet 3. On both longitudinal edges of supporting surface 2, guideways 4 for a beam 5 (cutting beam) are arranged, along which beam 5 is guided movably in the direction of double arrow 6. Beam 5 again consists of two guide rails 7 running parallel, on which a support 8 is guided movably in the direction of double arrow 9.

A cutting tool 11 and a grinding tool 12 are mounted rotatably or pivotably on support 8 around a common axis 10, which is oriented at a right angle to the glass sheet plane.

Cutting tool 11 exhibits, for example, a cutting wheel 14 rotatable around an axis 13 oriented parallel to the glass sheet plane and grinding tool 12 exhibits a grinding or polishing wheel 16 rotatable around an axis 15 oriented parallel to the glass sheet plane. A drive motor, not represented, is connected with axis 15 of grinding wheel 16, which can be flanged, for example, directly on housing 17 of grinding tool 12 coaxial to axis 15.

Axes 13 and 15 of cutting wheel 14 and of grinding wheel 16 are always parallel to one another and oriented at a right angle to the conveying direction (arrow 18).

In the embodiment represented in FIG. 2, grinding tool 12 is mounted rotatably on support 8 by its housing 17 and by a hollow shaft 19 around axis 10. A shaft 20 of cutting tool 11 is guided through hollow shaft 19 of grinding tool 12.

Shaft 20 of cutting tool 11 and hollow shaft 19 of grinding tool 12 are both mounted movably relative to one another and relative to support 8 in the direction of axis 10. To move cutting tool 11 and grinding tool 12 in the direction of axis 10, drive devices, not represented, for example, pressure medium cylinders, are provided, so that tools 11, 12, independently of one another, can be lowered on glass sheet 3 or raised from it.

To rotate cutting tool 11 or to pivot grinding tool 12 around axis 10, separate devices, not represented, such as, for example, rack and pinion gears, can be provided, and the control of the drive devices is configured so that axes 13 and 15 of tools 11 and 12 remain oriented parallel to one another.

According to another embodiment, it can be provided that shaft 20 of cutting tool 11 and hollow shaft 19 of grinding tool 12 are coupled torsion-resistant with one another, and axes 13 and 15 of tools 11 and 12 are oriented parallel to one another. The advantage of this embodiment lies in the fact that to rotate or to pivot tools 11, 12, only a single drive has to be provided.

The cutting of a glass sheet 3 and the removal of a coating applied on glass sheet 3 in a narrow range on both sides of a scratch line in a single operation can be performed with reference to FIG. 1, for example, as follows.

In a first operation before the beginning of the cutting and the removal of the coating, a glass sheet 3 is transported in the direction of arrow 21 in longitudinal direction to glass cutting table 1. Then, scratch lines 22 are made and simultaneously the coating is removed in the area of scratch lines 22 by grinding tool 12. This takes place preferably so that grinding tool 12 is ahead of cutting tool 11 in the direction of movement of support 8 crosswise to the longitudinal extension of glass cutting table 1. For this purpose, grinding tool 12 is pivoted alternately around axis 10 in the direction of arrows 23 and 24. At the same time, cutting tool 11 is rotated, so that axes 13, 15 of tools 11, 12 are always oriented parallel to the longitudinal extension of glass cutting table 1 and crosswise to the direction of movement of support 8. A temporary raising of cutting tool 11 or of grinding tool 12 is not absolutely necessary here, since the tools can run problem-free on longitudinal edges 24, 25.

Then, scratch lines 26 are made, and in FIG. 1, already made scratch lines 26 are represented with continuous lines and still to be made scratch lines 26 in the form of broken lines. Since scratch lines 26 inside glass sheet 3 end on scratch lines 22 running crosswise, attention must be paid that scratch lines 26, on the one hand, end exactly on scratch lines 22 running crosswise to them and that, on the other hand, only the narrow area next to scratch lines 26 has its coating removed, thus grinding tool 12 does not travel over affected scratch line 22. This is done so that at beginning 27 of a scratch line 26, grinding tool 12 first raised from glass sheet 3 is lowered on glass sheet 3, if axis 15 of grinding tool 12 is over scratch line 22. Support 8 then moves forward in the direction of arrow 21, until axis 13 of cutting tool 11 is over scratch line 22. Now, cutting tool 11 is also lowered. Support 8 then moves further, until axis 15 of grinding tool 12 is on end 28 of a scratch line 26, i.e., over another scratch line 22. Grinding tool 12 is raised from glass sheet 3 and support 8 moves further, until axis 13 of cutting tool 11 is also over scratch line 22. Now, cutting tool 11 is also raised from glass sheet 3 and support 8 can be moved to next scratch line 26 to be made.

Support 30 shown in FIG. 3 is movable over each two guide shoes 31 provided on both sides of support 30 on guideways 32, which are mounted on the top side of guide rails 7. Guide rails 7 connected with one another in a manner not shown are movable similar to that in the arrangement of FIG. 1 in the direction of double arrow 6 (x axis) over guideways 4 on both edges of glass cutting table 1. For the adjustment of support 30 along guide rails 7 (direction of double arrow 9, y axis), a rack and pinion gear can be mounted on one or both guide rails 7, in which a pinion gear driven by a drive motor (not shown), mounted on support 30, engages. Guide shoes 31 are mounted on an upper plate 33 of the basic unit of support 30. Plate 33, together with side walls 34 and a lower closing plate 35, borders a closed space 36 in support 30.

A rotary unit 38 rotatable around axis 10 is mounted on the basic unit of support 30 formed from said components 33, 34 and 35. Rotary unit 38 consists of an upper plate 39, which exhibits a toothing 40 on its outside peripheral edge, with which a pinion gear 41 meshes, which is driven by a drive motor 42 attached to upper plate 33 of the basic unit. Rotary unit 38 can be rotated around axis 10 by any angle (usually for 90°) by drive 41, 42.

Rotary unit 38 supports cutting tool 11 with a cutting wheel 14 by a lifting and lowering unit 45 designed as a pneumatic cylinder, which is fastened to upper plate 39 of rotary unit 38. Support 46 for cutting tool 11 penetrates a pot-shaped housing 47 and projects through an opening 49 in bottom 48 of pot-shaped housing 47. Pot-shaped housing 47 is fastened to upper plate 39 of rotary unit 38.

A drive motor 51 for grinding wheel 16 of grinding tool 12 is fastened to the outside wall of pot-shaped housing 47 by a plate 50, so that the drive motor, together with rotary unit 38 and cutting tool 11, pivots around axis 10, when drive 41, 42 is started.

A lever 52 is mounted pivotably on the housing of drive motor 51 for grinding wheel 16, on whose free end grinding wheel 16 is mounted rotatably. Lever 52 further supports a housing 55, which covers grinding wheel 16 up to its lowest area acting on a glass sheet 3 to be machined.

A drive made of a toothed belt 56 and two toothed wheels 57 and 58 is used for driving grinding wheel 16.

The free end of the piston rod of a pneumatic cylinder 61 acts on a projection 60 pointed upward from arm 52, cylinder which is supported on lower end plate 35 of rotary unit 38.

Further a tension spring 62 is fastened to lower plate 35 of rotary unit 38, whose other end acts on arm 52 at 63 and stresses arm 52 in the sense of a lifting of grinding wheel 16 from glass sheet 3 to be machined.

To press grinding wheel 13 on glass sheet 3 to be machined, an arrangement of three pressure medium motors placed side by side (pneumatic cylinders), which are oriented the same way as pressure medium motor 61, is preferably used, and two pneumatic cylinders provide for the contact pressure, and the third pneumatic cylinder is used as an operating cylinder.

In the case of pneumatic cylinder(s) 61 not acted on with pressure medium, grinding wheel 13 is raised from glass sheet 3 by tension spring 62.

A flexible tube 70 is connected in the area of an opening 71 to a side wall (the side wall facing away from the observer in FIG. 3) of housing 55 of grinding wheel 16. The other end of tube 70 is connected in the area of an opening 72 with lower end plate 35 of rotary unit 38. Inner space 73 of rotary unit 38 is connected by openings 74 with space 36 in the basic unit of support 30. A pipe 76, which leads to an air filter 77, is connected in the area of an opening 75 to upper end plate 33 of the basic unit of support 30. Air filter 77 is connected on its output by a connecting piece 78 with a device 79 to produce partial vacuum. Device 79 to produce partial vacuum operates preferably according to the injector principle, and thus a compressed air pipe 81 is connected to it. Air suctioned off from covering housing 55 of grinding wheel 16 and compressed air fed by line 81 exits by an end filter 80.

The free rotatability of rotary unit 38 is not impeded by the described way of suctioning off grinding dust, which results when the grinding wheel removes a coating from a glass sheet 3.

In the embodiment shown in FIG. 3, grinding wheel 13 is ahead of cutting tool 11, i.e., first a coating applied on glass sheet 3 is removed in strips, before cutting tool 11 scratches glass sheet 3. Grinding tool 12 and cutting tool 11 can be applied on the glass sheet independently of one another in the embodiment shown in FIG. 3 and can be raised again from the latter, but are always pivoted together, since both are mounted on rotary unit 38 rotatable around axis 10.

The direction of rotation of grinding wheel 13 is selected so that it moves in the area of its point of application to glass sheet 3 to be machined opposite the direction of movement of support 30.

To detect the wear of grinding wheel 13, i.e., to determine its effective radius, a plate 90, made of hardened metal or another abrasion-resistant material, is embedded—cf. FIG. 4—at a point of supporting surface 2 of glass cutting table 1 aligned in the latter with the upper side of support 2. A tracer finger 91 is provided in the area of this plate 90, which projects through an opening 92 into supporting surface 2 or into plate 90 and does not project over the upper side of supporting surface 2 in the readiness position shown in FIG. 4. A device (measuring ruler) 93 is coupled with tracer finger 91 that can be raised, which detects the way by which tracer finger 91 has been raised.

To determine the effective diameter of grinding wheel 16, thus indirectly its wear, grinding wheel 16 is moved by corresponding movement of support 30 in the area of hardened plate 90 and mounted on the latter. Tracer finger 91 is then raised until it rests on a defined point 94 of arm 52 supporting grinding wheel 16 or a stop connected with arm 52. The lift of tracing finger 91 is determined by measuring ruler 93 until it rests on arm 52 and the effective radius of grinding wheel 16 is determined from it.

The control of motor 51 for the rotary drive of grinding wheel 16 is always selected corresponding to the effective diameter of grinding wheel 16, so that its peripheral speed, thus the speed with which the periphery of grinding wheel 16 moves relative to glass sheet 3 to be machined, is adjusted to a constant value, which also does not change with increasing wear of grinding wheel 16 (the rpm is increased with wear of the grinding wheel corresponding to the degree of wear).

It should also be pointed out that in the embodiment shown in FIG. 3, the center plane of grinding wheel 13, which is perpendicular to its axis of rotation 15, goes in all positions through axis of rotation 10, around which cutting tool 11 is also rotatable.

FIG. 5 and 6 show, for example, a practical design of the embodiment explained in principle based on FIG. 3. Shaft 46 of cutting tool 11 can be incorporated adjustably in the direction of axis 10 by the special design of pot 47, but coupled for rotation. A rotary coupling is provided in shaft 46 of the cutting tool between lifting drive 45 and opening 49 in pot 47.

In the embodiment of FIG. 5 and 6, spaces 73 and 36 are designed together and used as suction chamber, which is bordered partly by support 30 and partly by rotary unit 38. Seals 95, e.g., labyrinth seals, are provided between the components, adjoining one another, of the rotating and of the stationary part.

In summary, the invention can be described, for example, as follows:

To simplify and to shorten the cutting of a glass sheet 3 with the help of a cutting tool 11 and the removal of a coating applied on glass sheet 3 with the help of a grinding tool 12, the scratching of glass sheet 3 and the removal of the coating in strips lying on both sides of the scratch lines, running parallel to the latter, are performed in a single operation. In the device proposed for this purpose, cutting tool 11 and grinding tool 12 are mounted on a common support 8 movable on a beam 5 over a supporting surface 2 for glass sheet 3. Grinding tool 11 is fastened to an auxiliary support 17, which can be pivoted around axis 10 of cutting tool 11 oriented perpendicular to supporting surface 2. Grinding tool 12 and cutting tool 11 can be raised from glass sheet 3 independently of one another and are mounted on the latter. Further, a suctioning of the dust accumulating during removal of the coating from glass sheet 3 is provided.

What is claimed is:

1. In a device for cutting a glass sheet (3) with a cutting tool (11), which can be rotated around an axis perpendicular to a supporting surface (2) for glass sheet (3) to be machined, and for removing a coating, applied on the glass sheet, with a grinding tool (12), which removes the coating from glass sheet (3) in strips lying on both sides of scratch lines (22, 26), running parallel to the grinding tool, with a beam (5), which is guided movably over said supporting surface (2) on its edges, and with a cutting tool (11) as well as a grinding tool (12), which are guided movably on beam (5) along the same; the improvement wherein the cutting tool (11) and grinding tool (12) are mounted on a common support (8) movable on said beam (5) and wherein the grinding tool (12) can be pivoted around an axis (10) perpendicular to said supporting surface (2).

2. Device according to claim 1, wherein said grinding tool (12) is fastened to an auxiliary support (17) which can be pivoted around an axis perpendicular to said supporting surface (2).

3. Device according to claim 1, wherein said grinding tool (12) together with said cutting tool (11) can be pivoted around said axis (10) around which said cutting tool (11) is rotatable.

4. Device according to claim 1, wherein said grinding tool (12) and cutting tool (11) can be raised away from said supporting surface (2) independently of one another.

5. Device according to claim 1, wherein a drive for pivoting said cutting tool (11) and a drive, independent of the first-mentioned drive, for pivoting said grinding tool (12) is provided.

6. Device according to claim 3, wherein a common drive for pivoting said cutting tool (11) and said grinding tool (12) is provided.

7. Device according to claim 1, wherein said support (8) is guided on said beam (5) by two guide rails (7) running parallel to one another.

8. Device according to claim 1, wherein a cutting wheel (14) is provided as said cutting tool (11) and wherein the axis of rotation (13) of said cutting wheel

(14) is parallel to the axis of rotation (15) of a grinding or polishing wheel (16) of said grinding tool (12).

9. Device according to claim 1, wherein said grinding tool (12), relative to the direction of movement (18) of cutting tool (11) is placed in front of the latter along the glass sheet (3).

10. Device according to claim 1, wherein a control is provided for lifting devices of said cutting tool (11) and said grinding tool (12), which control is so linked with a cutting program that the control controls the drives for the lifting of the cutting tool (11) and the grinding tool (12), when the latter reaches the end (28) of a scratch line (26) that has been made or is to be made in the glass sheet (3).

11. Device according to claim 1, wherein the cutting tool (11) and the grinding tool (12) are mounted on a rotary unit (38), which is mounted for rotation about said axis (10) in a base of a support (30).

12. Device according to claim 11, wherein the grinding tool (12) is mounted on an arm (52) that can be pivoted around an axis perpendicular to said axis of rotation (10), and a center plane of grinding tool (13), perpendicular to the axis of rotation of the grinding or polishing wheel of the grinding tool (13), passes through said axis (10).

13. Device according to claim 11, wherein a tension spring (62) is in tension between said rotary unit (38) and said arm (52), which spring stresses grinding tool (12) in a direction to lift said tool (12) from the glass sheet.

14. Device according to claim 11, wherein at least one pressure medium motor (61) to press said grinding tool (12) on the glass sheet is provided between said rotary unit (38) and a point of application (60) of said arm (52) disposed a distance from the pivot point of arm (52).

15. Device according to claim 14, wherein three pressure medium cylinders (61) are provided, of which two apply the contact pressure of the grinding tool (13) and the third acts as an operating cylinder to determine the extent of the lowering of the grinding tool (13).

16. Device according to claim 11, wherein said rotary unit (38) has a hollow space (73), in which a flexible tube (70) ends, which is connected with its other end to a housing (55), which covers the grinding tool (12) up to its lowest area in the use position.

17. Device according to claim 16, wherein at least one through-opening (74) is provided in the walls bordering the hollow space (73) in the rotary unit (38), which connects hollow space (73) with a hollow space (36) provided in the base of the support (30).

18. Device according to claim 17, wherein a pipe (76) is connected to said hollow space (36) in the support (30), which is connected on its other end with a device (79) to produce a partial vacuum.

19. Device according to claim 18, wherein said device (79) to produce a partial vacuum is an injector.

20. Device according to claim 11, wherein a circular plate (39) is provided on the upper side of said rotary unit (38), which is rotatably mounted on an upper end plate (33) of said support (30).

21. Device according to claim 11, wherein said plate (39) of said rotary unit (38) has a toothed ring on its outside periphery, which meshes with a driving pinion, which is coupled with a motor (42) to rotate the rotary unit around said axis (10).

22. Device according to claim 11, wherein a support (46) for said cutting tool (11) penetrates a sleeve-shaped element (47), which is connected with an upper plate (39) of said rotary unit (38).

23. Device according to claim 1, wherein a plate (90) made of hardened material is embedded in said supporting surface (2) for the glass sheet to be cut, whose upper side is aligned with the upper side of said supporting surface (2), wherein a tracing finger (91) is provided, which penetrates a recess (92), which is provided in plate (90), said tracing finger being connected with a measuring ruler (93), and wherein said tracing finger (91) is coupled with a drive for its lifting until it comes to rest at a defined point (94) on an arm (52) which supports said grinding tool (12).

24. Device according to claim 1, wherein a drive motor (51) for said grinding tool (12) is regulated as a function of the effective periphery of a grinding or polishing wheel of said grinding tool (12), so that the peripheral speed of said wheel is constant and does not change even in case of a reduction of the effective diameter of said wheel.

* * * * *